Jan. 10, 1933.  C. H. LAND  1,893,625

SHOCK ABSORBER

Filed Nov. 15, 1930  3 Sheets-Sheet 1

Inventor
Charles H. Land
By S. E. Thomas
Attorney

Jan. 10, 1933.  C. H. LAND  1,893,625
SHOCK ABSORBER
Filed Nov. 15, 1930   3 Sheets-Sheet 2

Inventor
Charles H. Land
By S. E. Thomas
Attorney

Jan. 10, 1933.                     C. H. LAND                     1,893,625
SHOCK ABSORBER
Filed Nov. 15, 1930            3 Sheets-Sheet 3
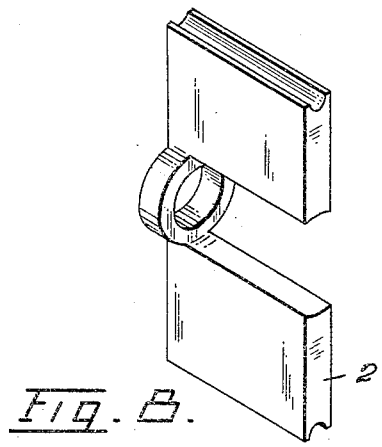
Fig. 8.
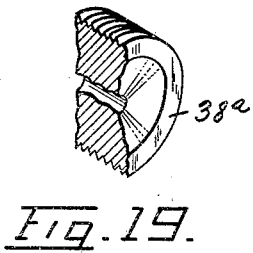
Fig. 19.
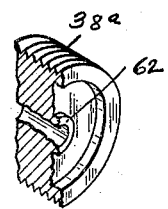
Fig. 20.
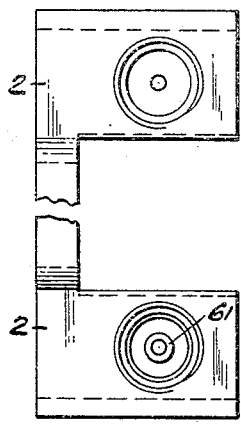
Fig. 9.
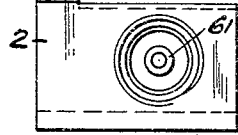
Fig. 10.
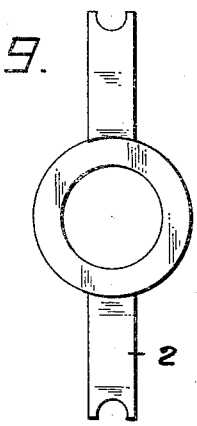
Fig. 11.
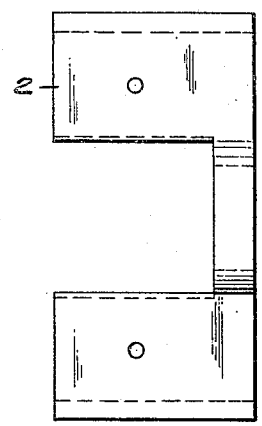
Fig. 12.
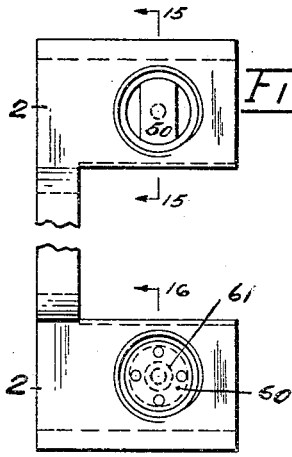
Fig. 13.
Fig. 14.
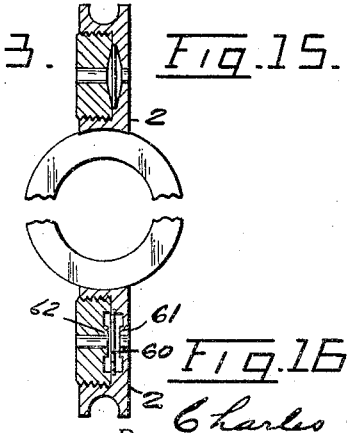
Fig. 15.
Fig. 16.
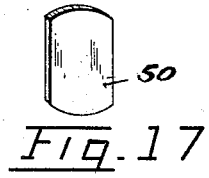
Fig. 17.
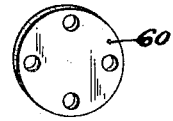
Fig. 18.
Inventor
Charles H. Land
By S. E. Thomas  Attorney Patented Jan. 10, 1933

1,893,625

UNITED STATES PATENT OFFICE

CHARLES H. LAND, OF GROSSE POINTE, MICHIGAN, ASSIGNOR TO MECHANICAL DEVELOPMENT COMPANY, OF DETROIT, MICHIGAN, A CORPORATION OF MICHIGAN

SHOCK ABSORBER

Application filed November 15, 1930. Serial No. 495,866.

This invention relates to a shock absorber of the hydraulic type where liquid is forced from one compartment to another and serves as the medium to control the relative movement of two bodies.

The principal object of the invention is to provide a simple, durable, and cheap valve of the loaded-open type which will insure the proper absorption of excess energy by automatically restricting in an increasing degree the high velocity flows through a hydraulic line from one compartment to the other.

Another object of the invention is the arrangement of the auxiliary by-pass ports with relation to the abutments to insure a more flexible control of liquid for the excess energy absorption.

Another object of the invention is to provide a loaded-open spring valve of one piece that automatically restricts the high velocity flows through a hydraulic line in either direction at any position of the pistons.

With the foregoing and other objects in view which will appear as the description proceeds, the invention further resides in the combination and arrangement of parts and in the details of construction hereinafter described and claimed, it being understood that changes may be made in the precise embodiment of the invention herein shown without departing from the spirit of the same.

In the drawings accompanying this specification:

Figure 8 is a perspective view of the abutment removed from the cylindrical casing.

Figure 9 is a fragmentary side elevation of a modification of the abutment, showing a valve chamber with a port opening through its cone-shaped wall,—the plug—Figure 19—forming the opposing cone-shaped wall of the valve chamber having been removed.

Figure 10 is a similar view of a fragment of another modification of the abutment, having a valve chamber corresponding with that indicated in the cross-sectional view shown in Figure 16.

Figure 11 is an end elevation typical of the several abutments shown.

Figure 12 is a side elevation of the abutment viewed from the side opposite that indicated in Figures 9, 10, 13 and 14.

Figure 13 is a fragmentary side elevation of another modification of the abutment, with the valve—shown in Figure 17—inserted, the plug forming the opposite wall of the valve chamber having been removed to disclose the interior of the chamber.

Figure 14 is a fragmentary side elevation of the abutment showing another modification in the construction of the valve chamber, with the valve in position, the plug—see Figure 20—forming the opposite side of the valve having been removed.

Figure 15 is a fragmentary cross-sectional view taken on or about line 15—15 of Figure 13, with the plug in place.

Figure 16 is a fragmentary cross-sectional view taken on or about line 16—16 of Figure 14, with the plug in place.

Figure 17 is a perspective view of the valve, as housed in the chamber shown in Figures 13 and 15.

Figure 18 is a perspective view of the disc-valve shown in Figures 14 and 16.

Figure 19 is a sectional perspective view of the plug forming one of the opposing walls of the valve chamber indicated in Figure 9, between which the valve-disc is loosely lodged.

Figure 20 is a similar sectional perspective view of the plug forming one wall of the valve chamber in the abutment shown in Figures 14 and 16.

Referring now to the reference numerals indicating like parts in the several views:

Figure 1:
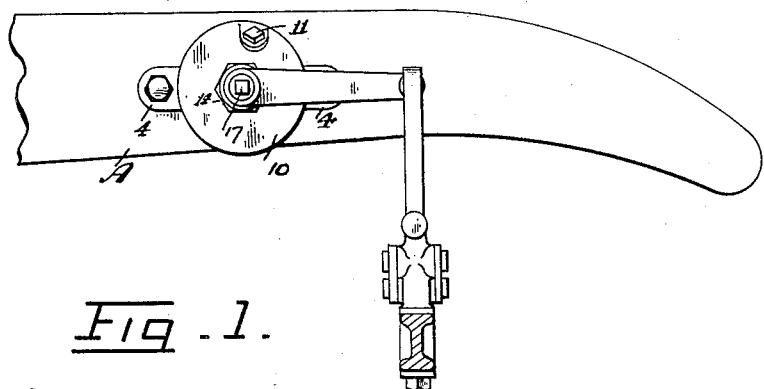
Figure 1 is a fragmentary side elevation, with parts in section, of the chassis of an automobile equipped with the shock absorber.
Figure 3A:
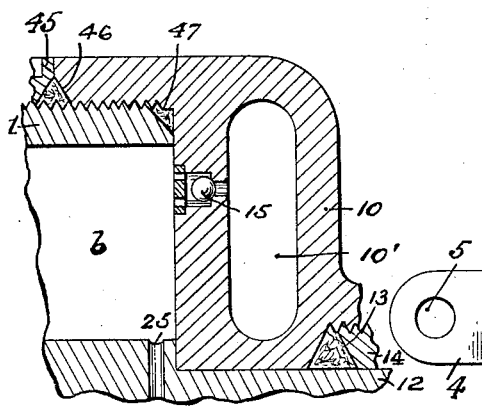
Figure 3A is a fragmentary cross-sectional view—on a relatively larger scale—of a detail of construction, taken on or about line 3A—3A of Figure 2.

The apparatus consists of a cylindrical casing 1 divided into two compartments by abutments 2—2, which are locked to the casing by key pins 3—3. From the outer circumference of the cylindrical casing project ears 4—4 provided with bolt holes 5—5 for attaching the device to the frame A of a motor vehicle.

A bearing lug 6 integral with the casing receives the countersunk end of a shaft 7 provided with two blades 8 and 9 which act as pistons and divide the cylinder into four compartments $a$, $b$, $c$ and $d$. The cylindrical casing 1 is covered by a screw cap 10 provided with a reserve fluid chamber $10^1$ for liquid. The reserve fluid chamber $10^1$ is in turn fitted with a screw plug 11 to close a hole through which the chamber is filled with fluid.

The shaft 7 has an integral projecting spindle 12 extending through the screw cap 10, and a stuffing box consisting of a leather washer 13, and a compression nut 14.

Ball check valves 15, 16 control ports, through which the fluid flows from the reserve chamber $10^1$ to the working chamber of the cylindrical casing.

The spindle 12 is bored to provide for a valve rod 17 threaded for a portion of its length to allow for adjustment. The valve rod at its outer end is formed with a squared head—to provide for adjustment—and it passes through a stuffing box consisting of a fiber packing 20 and a compression nut 21. The inner tapering end 22 of the valve rod controls the flow of fluid through conduits 23, 24, 25 and 26, see Figure 2.

The opening into these conduits are grooved slightly in the direction of the pistons 8, 9. The shaft 7 is provided with four transverse conduits 27, 28, 29, 30. At the bottom of the recess in shaft 7, a conical face 31 is formed and a port 32 is bored at the center of the cone-face opening into the ports 27 and 28. A thin flat spring-valve disc 33 fits on the circumferential edges of the cone face 31 at the bottom of the recess in the shaft.

The disc has several port-holes 34, 35, 36, 37 punched through it in different spaced relation to the center.

Figure 7:
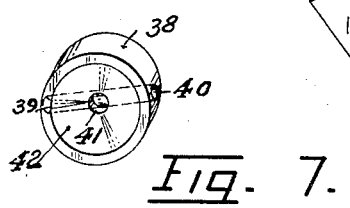
Figure 7 is a perspective view of a plug seated by a driving fit in the countersenk portion of the shaft with a one-shaped- face opposed to that shown in the preceding view, between which the spring-dis valve is housed.

A plug 38,—see Figure 7,—drilled with conduits 39 and 40 and port-hole 41 is also provided with a conical face 42. This plug is forced by a driving fit into the cylindrical countersunk hole of the shaft 7, so that the conduits 39 and 40 register with conduits 29 and 30, forming a double cone face pocket in which the spring valve 33 is loosely fitted.

A locking ring 45 is screwed on the casing 1 with a packing ring 46 between the ring and the screw cap 10 to secure the parts and to insure against leakage.

A ring packing 47 is also located between the screw cap 10 and the wall of the cylindrical casing.

In the several views, 9 to 19 inclusive, of the abutment, and details of the valve chamber, are indicated modifications which upon the oscillation of the piston due to the vibration of the vehicle, serve to automatically and progressively restrict the fluid flow through the hydraulic line to absorb excess vibration.

In Figures 9, 10, 12, 13, 14, 15 and 16 are shown modifications of the abutment 2, with valves for absorbing excess vibration located in the abutment instead of in the piston hub or shaft 7, as previously indicated. It will be apparent however that valves may be fitted to the hub or shaft 7, and also to the abutments if desired, the several valves being designed jointly to cooperate in the control of excess vibration.

The valve 50 shown in Figure 17 and employed in the valve chamber shown in Figures 13 and 15 permits the fluid to pass its side edges with very little deflection of the valve under normal action of the vehicle springs,—if however the vehicle encounters a rough road surface, the spring valve will be deflected toward and against the inclined walls of the valve chamber, thus retarding the movement of the piston and causing a corresponding retardation of the vehicle frame in relation to the axle.

The valve 60 shown in Figure 18 and employed in the valve chamber shown in Figures 14 and 16 is a sheet metal disc perforated adjacent its marginal edge for the passage of fluid under normal working conditions, it being adapted to gradually seat under excess hydrostatic pressure against either of the opposing raised valve seats 61 and 62 formed respectively in the wall of the abutment and in the plug $38^a$,—see Figures 10, 14, 16 and 20.

The valve disc indicated in Figure 18 is also adapted for use in the valve chamber shown in Figure 9 between the opposing cone-shaped walls of the chamber and the cone-shaped wall of the plug 38ª, see Figure 19.

Having now indicated the several parts by reference numerals, the construction and operation of the device will be readily understood.

Figure 2:
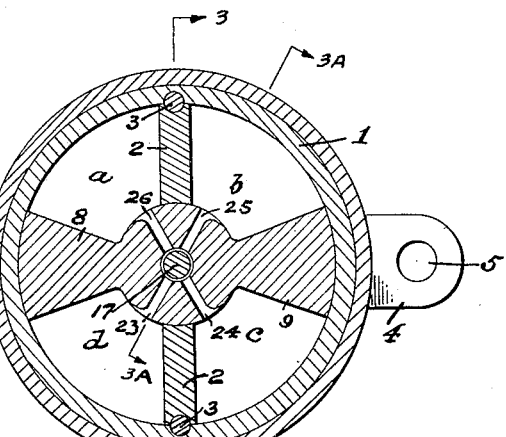
Figure 2 is a transverse sectional view through the device, taken on or about line 2—2 of Figure 3.
Figure 3:
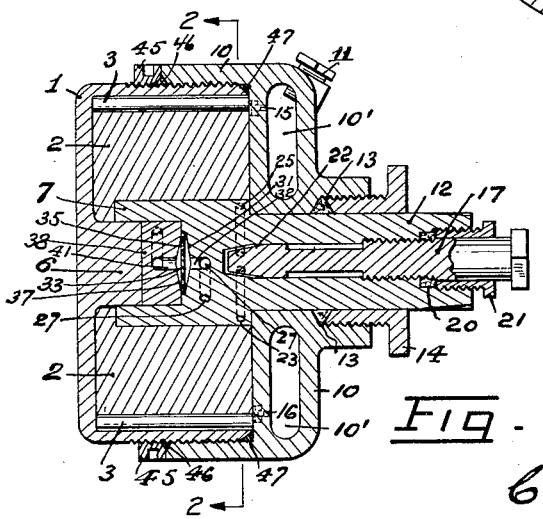
Figure 3 is a cross-sectional view taken on or about line 3—3 of Figure 2.
Figure 4:
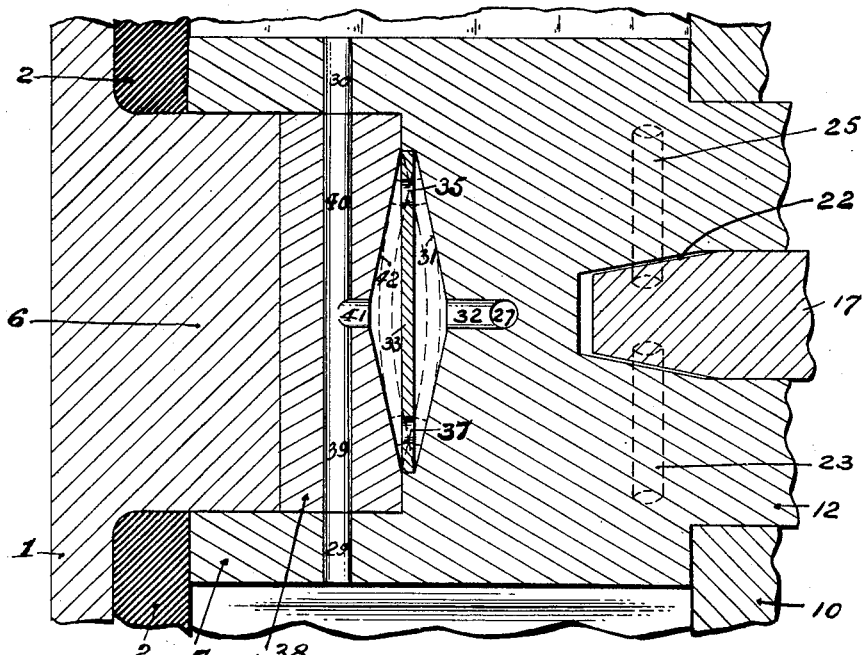
Figure 4 is an enlarged cross-sectional view of a fragmentary portion of the device housing a ported loaded-open spring valve disc, for automatically restricting the high velocity flows in either direction at any position of the pistons, and in dotted lines the disc deflected as when functioning to provide a sealing or near sealing contact with the opposing cone-shaped walls of the device.
Figure 5:
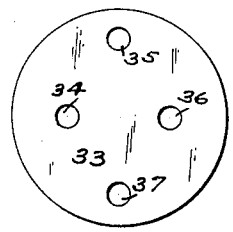
Figure 5 is an elevation—on a relatively large scale—of the ported spring-disc valve.
Figure 6:
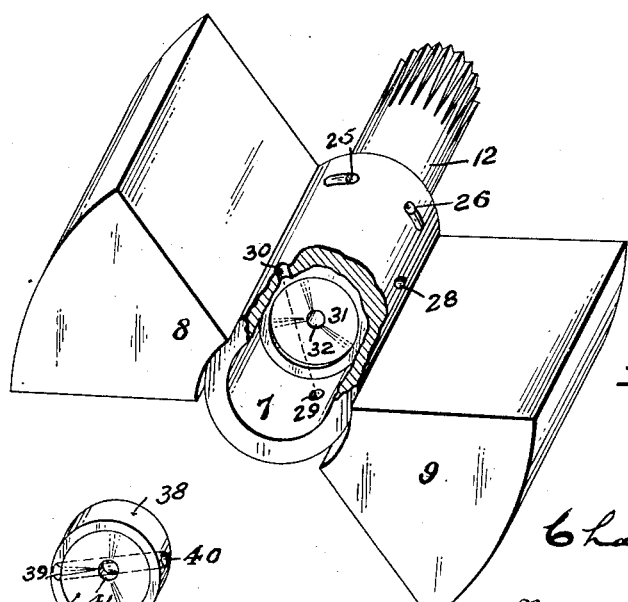
Figure 6 is a perspective view with parts broken away showing a countersunk shaft, with integral projecting blades serving as pistons,—showing one face of a double cone-shaped pocket in which the spring-disc valve is loosely lodged.

Under normal conditions, the pistons 8 and 9 will be about in the center of the cylinder, see Figure 2.

When the pistons 8 and 9 are moved in a clock-wise direction due to the vehicle striking an obstruction, the fluid in compartments $a$ and $c$ is forced through conduits 27 and 28 into port 32 through ports 34, 35, 36, 37 of spring valve 33, through port 41, conduits 39, 40 and out conduits 29, 30 into compartments $b$ and $d$.

If the movement of the pistons is slow due to slight obstruction of the vehicle wheels, the fluid will pass through ports 34—35—36—37 in the spring disc with very little deflection of the spring disc valve and therefore a normal action of the vehicle springs is maintained, and very slight duty is required of the fluid to absorb the shock as abnormal pressures are not developed.

If a more severe obstruction causes a higher rate of travel to the pistons and the fluid, the spring valve disc may be deflected against the conically tapered face of the seat 31 and ports 35-37 will be thereby closed or partially closed, thus retarding the movement of the piston and a consequent retardation of the vehicle frame in reference to the axle.

The ports 34-36 through the spring disc valve being closer to the center will have a greater distance to travel to seat on the incline of the cone face and therefore it will require a much greater velocity of the oil to cause them to seat.

It will be noted that the judicious selection of the number of holes, their area, and spaced relation to the center of the valve disc gives a wide range for the progressive shut-off of the fluid flow. The abruptness of check is thus eliminated and a very comfortable ride may be obtained.

On a counterclockwise movement, the single spring disc valve functions exactly as previously described, but is deflected in an opposite direction.

The conduits 23—24—25—26 are grooved slightly at the point of entry in the shaft 7 on the side toward the pistons, thus insuring a gradual uniform shut-off of the fluid flow when excessively long movements of the body relative to the piston are produced.

An average comfortable ride of the vehicle is best obtained when the valve rod 17 is adjusted to a position in which the ports 23—24—25—26 are about half open;—at this position, the spring disc valve 33 takes care automatically of the average throw, however it has been found that the uniformly added resistance of the ports 23—24—25—26 passing under the abutments 2—2 automatically controls excessive vibrations.

In other types of loaded open valves, abrupt closure produces very annoyable jerky action and with it a very objectionable noise,—caused by the valve seating. The progressive diaphragming action of the present spring valve eliminates the jerking action referred to and is noiseless.

As indicated in the drawings the port openings through the disc valve may be eliminated and still automatically effect a flexible control of the high velocity flow in either direction at any position of the pistons,—so also the opposed conical walls of the valve chamber—between which the disc valve is medially disposed when static—may be inclined otherwise than conical if desired.

Having thus described my invention, what I claim is:

1. In a recoil compensator and shock absorber, adapted for connection with elements respectively movable in relation to each other; a casing; a hydraulic line; a wing piston located in the casing; a shaft carrying said piston journaled in the casing having a valve chamber connected with said hydraulic line, with seats spaced apart to receive a valve; a valve formed of sheet metal housed in said valve chamber, adapted to diaphragm in either direction under predetermined hydrostatic pressure toward the valve seats of the valve chamber, to progressively restrict fluid flow through the hydraulic line to absorb excess vibration.

2. In a recoil compensator and shock absorber suitably connected with elements respectively movable in relation to each other; a casing; a hydraulic line; a wing piston located in the casing; a shaft carrying said piston journaled in the casing, having a valve chamber connected with the hydraulic line; said valve chamber having seats spaced apart to receive a valve; a valve formed of resilient sheet metal housed in said valve chamber, said valve being adapted to diaphragm in either direction under predetermined hydrostatic pressure toward the respective valve seats of the valve chamber to progressively restrict the fluid flow through the hydraulic line to absorb excess vibration.

3. In a recoil compensator and shock absorber suitably connected with elements respectively movable in relation to each other; a casing; a hydraulic line; a wing piston located in the casing; a shaft carrying said piston journaled in the casing having a valve chamber connected with the hydraulic line, said valve chamber having opposed inclined seats spaced apart to receive a valve; a valve formed of resilient sheet metal housed in said chamber, said valve being adapted to deflect in either direction under predetermined hydrostatic pressure toward the inclined seats of the valve chamber that it may progressively restrict the fluid flow through the hydraulic line to absorb excess vibration.

4. In a recoil compensator and shock absorber suitably connected with elements respectively movable in relation to each other; a rocking piston including a shaft for supporting the piston, said shaft provided with a valve chamber having opposed conical seats spaced apart to receive a valve; a hydraulic line connected with said valve chamber; a valve formed of resilient sheet metal housed in said valve chamber deflectable under predetermined hydrostatic pressures in either direction toward the conical seats of the valve chamber, whereby it may progressively restrict the fluid flow through the hydraulic line to absorb vibration.

5. In a recoil compensator and shock absorber, suitably connected with elements respectively movable in relation to each other; a hydraulic line including a valve chamber having opposed conical seats spaced apart to receive a valve; a valve formed of resilient sheet metal housed in said chamber having a plurality of ports for the passage of fluid, said valve being adapted to deflect in either direction under predetermined hydrostatic pressures toward the conical seats of the valve chamber that it may progressively restrict the fluid flow through the hydraulic line to absorb vibration.

6. In a shock absorber adapted to be connected with elements respectively movable in relation to each other; a hydraulic line including a valve chamber having opposed conical seats spaced apart to receive a valve; a spring disc valve loosely interposed between the opposing seats of the valve chamber, said disc valve being perforated with ports at varying distances from the center of the disc, said valve being adapted to offer only a slight resistance to the flow of fluid in either direction under low velocities, but under relatively high velocities adapted to be deflected toward a closed or nearly closed position to restrict the fluid flow through said ports, thus by successive stages progressively advancing to control and restrict the fluid flow through said hydraulic line to absorb vibration.

7. In a shock absorber, a working chamber having radial abutments therein; an oscillating shaft having two blades serving as pistons movable between the abutments; said oscillating shaft formed with a valve chamber having cone-shaped opposing walls spaced apart to receive a disc-valve, said shaft provided with a plurality of radially disposed passages respectively connecting the working chamber with ports opening into the valve chamber on opposite sides of the valve; and a spring disc-valve provided with a plurality of ports therethrough disposed at relatively different distances from its center; whereby upon the deflection of said disc by hydrostatic pressure on either side of said valve, the ports through the valve will be progressively restricted and gradually closed as the valve is forced toward and in contact with either of the opposing cone-shaped walls of the valve chamber.

8. A structure as specified in claim 7, in combination with a screw-threaded valve rod for controlling the flow of fluid through radial passages in the oscillating shaft.

9. In a shock absorber; a cylindrical pressure chamber; radial abutments dividing said chamber; key pins adapted to lock said abutments to the walls of the pressure chamber; an oscillating shaft countersunk at one end to receive a bearing lug integral with the wall of the pressure chamber, the countersunk portion of the shaft having a cone-shaped face at the end of the recess; a plug having a cone-shaped face secured in the countersunk recess of the oscillating shaft in spaced relation to the cone-shaped face at the recessed end of the shaft, forming a valve chamber; a perforated resilient disc-valve lodged loosely between the opposing cone-shaped walls of the valve chamber; said shaft provided with a plurality of radially disposed passages respectively connecting the pressure chamber with ports opening into the valve chamber on opposite sides of the valve; a cap, provided with a reserve fluid chamber, screwed upon the cylindrical wall of the pressure chamber; a screw plug fitted to the wall of said reserve fluid chamber; and check valves between the reserve fluid chamber and the pressure chamber through which fluid may pass from the fluid chamber into the pressure chamber.

10. In a shock absorber, a working chamber having radial abutments therein; an oscillating shaft formed with a valve chamber having inclined opposing walls spaced apart to receive a disc-valve, said shaft having a plurality of radially disposed passages connecting the working chamber with ports opening into the valve chamber on opposite sides of the valve, said radially disposed passages having short peripheral grooves extending toward the pistons, whereby a gradual uniform cut-off of the fluid flow may be effected; and a spring disc valve lodged in said valve chamber and normally in spaced relation to the opposing inclined walls of the valve chamber, whereby upon the deflection of said disc valve by hydrostatic pressure on either side of said valve, said valve will be gradually seated as it is forced toward and in contact with either of the opposing inclined walls of the valve chamber.

11. In a shock absorber adapted for connection with elements respectively movable in relation to each other; a working chamber having radial abutments therein including valve chambers having seats spaced apart to receive a valve; valves formed of resilient sheet metal housed in said chambers, said valves being adapted to alternately deflect in either direction under predetermined hydrostatic pressure toward the seats of the valve chamber that they may progressively restrict the fluid flow through said radial abutments to absorb vibration; and an oscillating shaft, having a plural number of blades serving as pistons movable between said abutments.

12. In a shock absorber adapted for connection with elements respectively movable in relation to each other; a working chamber having an abutment therein including a valve chamber having seats spaced apart to receive a valve; a valve formed of resilient sheet metal housed in said chamber, said valve being adapted to alternately deflect in either direction under predetermined hydrostatic pressure toward the seats of the valve chamber that it may progressively restrict the fluid flow through said abutment in either direction to absorb vibration; and an oscillating shaft, having a blade serving as a piston movable toward and away from said abutment.

13. A shock absorber comprising a casing; a wing piston located therein; a shaft carrying said piston journaled in said casing; a regulating valve carried by said shaft; a valve chamber with opposing spaced seats within the shaft; and a disc valve for controlling the passage of fluid, located between said spaced seats ahead of the regulating valve.

14. A shock absorber comprising a casing; a wing piston therein; a shaft carrying said wing piston journaled in the casing; and a valve located in a valve chamber within the shaft and casing, said valve consisting of a sheet metal disc adapted to alternately diaphragm against opposing valve seats in the valve chamber under predetermined hydrostatic pressures.

15. A shock absorber comprising a casing; an abutment therein dividing the casing into a plurality of chambers; a wing piston located in said casing; a shaft carrying said piston journaled in the casing and having fluid passages therein; and a valve housed in a valve chamber within the shaft between the front and rear faces of the wing piston for controlling said passages, said valve consisting of a sheet metal disc adapted to alternately diaphragm against opposing valve seats in the valve chamber under predetermined hydrostatic pressure.

16. A shock absorber comprising a casing; an abutment therein dividing the casing into a plurality of chambers; a wing piston located in said casing; a shaft carrying said piston journaled in the casing and having fluid passages therein; a valve housed in a valve chamber within the shaft between the front and rear faces of the wing piston for controlling said passages, said valve consisting of a sheet metal disc adapted to alternately diaphragm against opposing valve seats in the valve chamber under predetermined hydrostatic pressure; and a regulating valve also located within the shaft in the front of said first named valve.

17. A shock absorber comprising a casing; an abutment therein dividing the casing into a plurality of chambers; a wing piston located in said casing; a shaft carrying said piston journaled in the casing and having fluid passages therein; and a valve housed in a valve chamber within the shaft between the front and rear faces of the wing piston for controlling said passages, said valve consisting of a resilient sheet metal disc adapted to alternately diaphragm against opposing valve seats in the valve chamber under predetermined hydrostatic pressure.

18. In a shock absorber suitably connected with elements respectively movable with relation to each other and comprising a casing, a piston therein; a shaft journaled in the casing supporting the piston having fluid passages therethrough communicating with the valve chamber within said shaft, said valve chamber having opposing inclined valve seats spaced apart; and a resilient valve disc located in said valve chamber, adapted for progressively controlling the fluid flow through said passages to absorb excess vibration.

In testimony whereof, I sign this specification.

CHARLES H. LAND.